(12) United States Patent
Aoki

(10) Patent No.: US 6,476,993 B1
(45) Date of Patent: Nov. 5, 2002

(54) SIGNAL PROCESSING APPARATUS AND METHOD WHEREIN CONTROL SIGNALS AND POWER SIGNALS ARE SUPERIMPOSED

(75) Inventor: Yoji Aoki, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/595,374

(22) Filed: Jun. 15, 2000

(30) Foreign Application Priority Data

Jun. 16, 1999 (JP) .......................................... 11-169763

(51) Int. Cl.[7] .............................. G11B 15/14; G11B 5/09
(52) U.S. Cl. ............................ 360/64; 360/46; 360/316
(58) Field of Search ............................... 360/46, 64, 316

(56) References Cited

U.S. PATENT DOCUMENTS

| | | | |
|---|---|---|---|
| 4,851,935 A | * 7/1989 | Ohyama et al. | ............... 360/64 |
| 5,369,534 A | * 11/1994 | Han | ............................ 360/64 |
| 5,519,262 A | * 5/1996 | Wood | .......................... 307/104 |
| 5,734,532 A | * 3/1998 | Kobayashi et al. | ......... 360/316 |
| 5,933,289 A | * 8/1999 | Sano et al. | .............. 360/77.16 |

* cited by examiner

Primary Examiner—Regina N. Holder
(74) Attorney, Agent, or Firm—Frommer Lawrence & Haug LLP; William S. Frommer

(57) ABSTRACT

A compact rotary transformer is disclosed. In the structure of the rotary transformer, a timing-signal producing unit detects a control signal superimposed on an electric power signal output from a power transmission channel of the rotary transformer to produce a timing signal. A head-switching-signal generating unit uses the timing signal to generate a switching signal for performing switching between reproducing heads so that one of the reproducing heads is selected by a switch. A reproduction channel of the rotary transformer outputs a reproducing signal via the switch.

20 Claims, 13 Drawing Sheets

SIGNAL PROCESSING APPARATUS AND METHOD WHEREIN CONTROL SIGNALS AND POWER SIGNALS ARE SUPERIMPOSED

BACKGROUND OF THE INVENTION

1. Field of the Invention

The present invention relates to apparatuses and methods for processing signals, and more particularly, the invention relates to apparatuses and methods for processing signals having structures simplified by superimposing controlling signals on electric power signals transmitted via rotary transformers.

2. Description of the Related Art

In conventional video tape recorders (VTR), recording tracks are made narrower and wavelengths of the records are shortened to improve recording densities. In addition, in order to increase a data transmission rate of digital recording, the frequency of a reproducing signal needs to be higher. However, in the above cases, since an output from a reproducing head decreases, influence of noises from the outside thereby increases, with the result that the signal-to-noise ratio (S/N) of the reproducing-signal output decreases.

There are provided methods for solving the above problems. For example, an amplifier is disposed inside a rotary drum, and the amplifier and a reproducing head are connected in such a manner that they are disposed close to each other so as to reduce influence of the noises from the outside. In addition, a high-output reproducing head such as a Magneto-Resistive (MR) head is adopted to prevent the problems described above.

In these methods, however, since a bias current for the MR head or a power supply of the amplifier is required, electric power needs to be supplied to the rotary drum in some way.

Thus, an electric-power supplying method using a slip-ring, as shown in FIG. 1, is known. In this figure, a rotary drum 2 as a rotary unit rotates on a fixed drum 1 as a static unit. Electric power generated at the static unit is supplied to an amplifier or an MR head in the rotary unit, both of which are not shown in the figure, via a slip-ring 4. The slip-ring 4 is in contact with brushes 5. An insulating ring 6, as shown in FIG. 2, allows each of the brushes 5 to be insulated. A magnetic head 3 of the rotary drum 2 records a signal on a tape, which is not shown in the figure, or reproduces the signal recorded thereon.

As another electric-power supplying method, there is known a method in which an electric-power supplying winding is disposed in a rotary transformer 11 as shown in FIG. 3. The rotary transformer 11 is constituted of a power transmission channel 12, short-rings 13, recording channels 14-1 and 14-2, and reproduction channels 15-1 and 15-2. With a magnetic field generated in the winding disposed in grooves, signal transmission/reception is performed in each recording channels 14-1 and 14-2, and reproduction channels 15-1 and 15-2. In this arrangement, as shown in FIG. 3, the two recording channels 14-1 and 14-2, and the two reproduction channels 15-1 and 15-2 are disposed. The short-rings 13 are disposed to suppress crosstalk occurring between the power transmission channel 12 and the signal transmission channels including the recording channels 14-1 and 14-2 and the reproduction channels 15-1 and 15-2.

In order to sufficiently suppress the aforementioned crosstalk, since the double short-rings 13 are disposed, the size of the rotary transformer is increased. Thus, as shown in FIG. 4, there is also known a rotary transformer 11 in which a single short-ring is provided.

In terms of electric-power supply performed for a VTR, the structure of the example shown in FIG. 1 is complicated, production cost and the size of the apparatus are increased.

In the example shown in FIG. 3, since there are many grooves, the size of the rotary transformer is increased.

Furthermore, in the example shown in FIG. 4, since only a single groove is used for the short-ring, crosstalk occurring between the power transmission channel 12 and the signal transmission channels cannot be sufficient suppressed.

Therefore, in any of the above conventional methods provided in FIGS. 1 to 4, it is impossible to sufficiently suppress the above-mentioned crosstalk while the size of the apparatus is maintained small.

SUMMARY OF THE INVENTION

Accordingly, it is an object of the present invention to provide an apparatus and a method for processing signals, in which a control signal is superimposed on an electric power signal transmitted to a rotary transformer so as to reduce the size of the rotary transformer while crosstalk between a power transmission channel and signal transmission channels can be sufficiently suppressed.

To this end, according to an aspect of the present invention, there is provided a signal processing apparatus including a static unit, a rotary unit rotating in relation to the static unit, a rotary transformer, via which signal reception/transmission is performed between the static unit and the rotary unit, a unit for generating an electric power signal supplied to a circuit inside the rotary unit from the static unit, a unit for superimposing a control signal controlling the circuit inside the rotary unit on the electric power signal generated by the generating unit, a unit for supplying electric power to the circuit inside the rotary unit by detecting the electric power signal from the signal supplied to the rotary unit via the rotary transformer; and a unit for controlling the circuit inside the rotary unit by detecting the control signal from the signal supplied to the rotary unit via the rotary transformer.

Furthermore, according to another aspect of the present invention, there is provided a signal processing method using a signal processing apparatus in which signal reception/transmission is performed between a static unit and a rotary unit rotating in relation to the static unit via a rotary transformer. The signal processing method includes the steps of (1) generating an electric power signal supplied to a circuit inside a rotary unit from a static unit, (2) superimposing a control signal for controlling the circuit inside the rotary unit from the static unit on the electric power signal generated by the generating step, (3) supplying electric power to the circuit inside the rotary unit by detecting the electric power signal from the signal supplied to the rotary unit via a rotary transformer, and (4) controlling the circuit inside the rotary unit by detecting the control signal from the signal supplied to the rotary unit via the rotary transformer.

In the above-described apparatus and method, the control signal is superimposed on the electric power signal.

DESCRIPTION OF THE PREFERRED EMBODIMENTS

Figure 3:
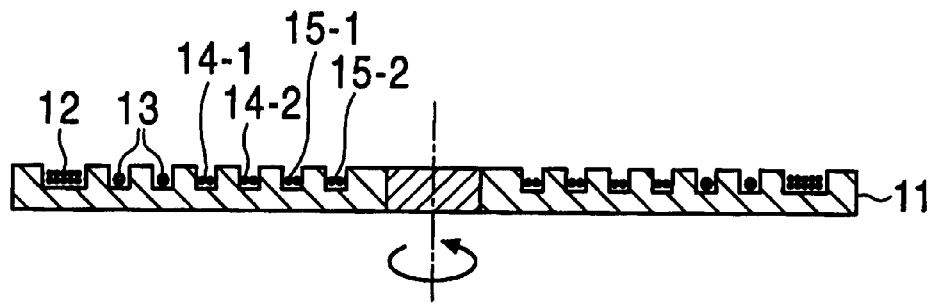
FIG. 3 is a sectional view showing the structure of a conventional rotary transformer.
Figure 4:
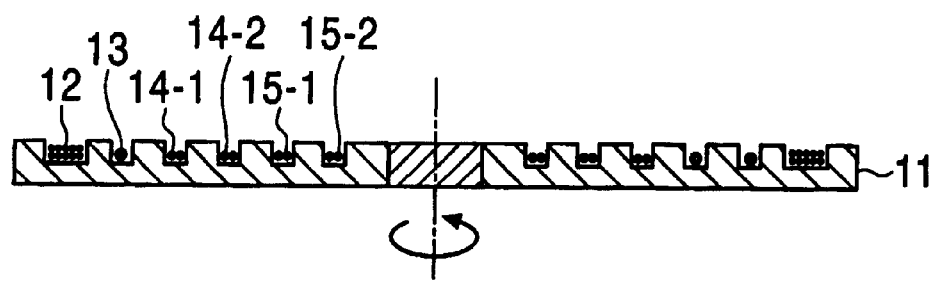
FIG. 4 is a sectional view showing the structure of another conventional rotary transformer.
Figure 5:
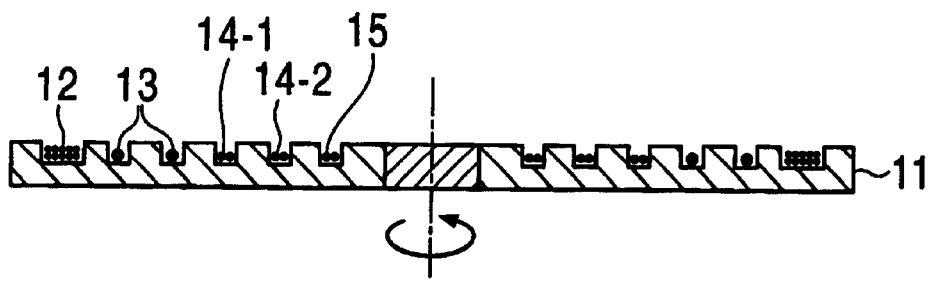
FIG. 5 is a sectional view showing a structural example of a rotary transformer applying the present invention.

FIG. 5 shows the structure of a rotary transformer according to an embodiment of the present invention. In this figure, the same reference numerals are given to the parts of the rotary transformer that are equivalent to those shown in the conventional cases, and the explanation thereof is omitted. As seen in FIG. 5, regarding the number of reproduction channels, only one reproduction channel 15 is provided. However, the other structural parts are the same as those shown in FIG. 3.

Figure 1:
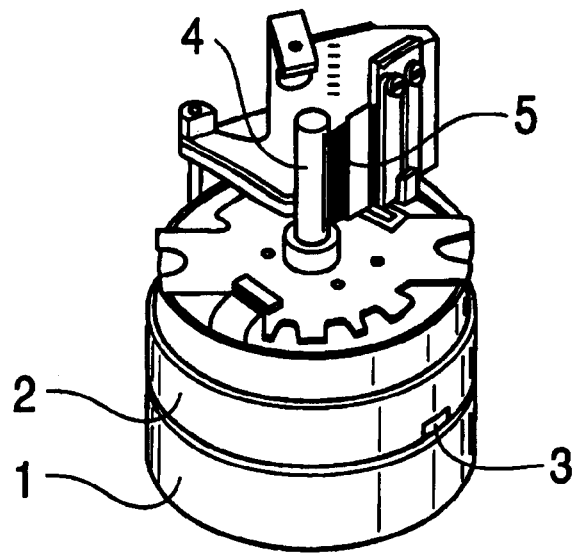
FIG. 1 is a perspective view showing a structure of a conventional rotary drum.
Figure 2:
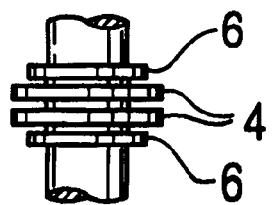
FIG. 2 is a side view showing the structure of a slip* ring 4 shown in FIG. 1.

In this case, reproducing heads 27-1 and 27-2 which are MR heads, and recording heads 29-1 and 29-2, which correspond to the magnetic heads 3 shown in FIG. 1, are disposed on a rotary drum 2 rotating on a fixed drum 1, as in the case of the magnetic heads 3. However, the rotary drum 2 of the present invention does not include the slip-ring 4 and the brushes 5 disposed in the conventional rotary drum shown in FIG. 1.

Figure 7:
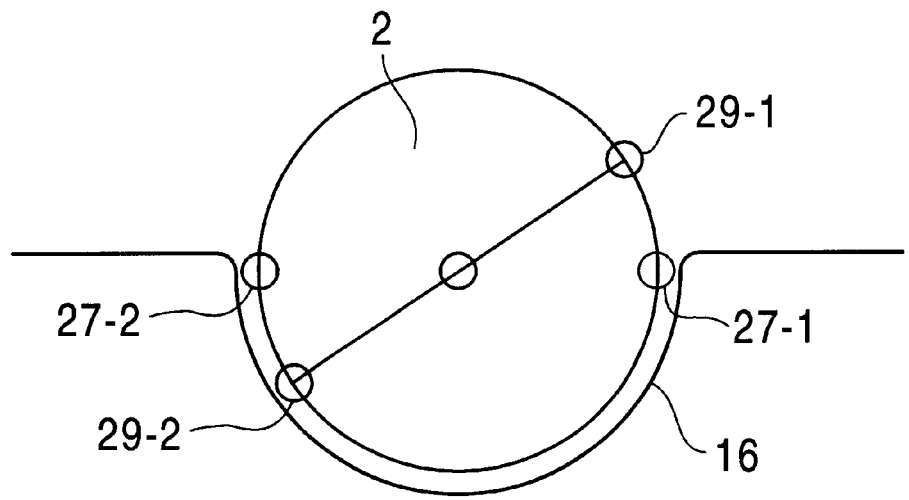
FIG. 7 is a view illustrating a situation in which a magnetic tape is wounded around the rotary drum.

FIG. 7 shows a state in which the reproducing MR heads 27-1 and 27-2, and the recording heads 29-1 and 29-2 mentioned above are disposed on the rotary drum 2. The reproducing MR heads 27-1 and 27-2, and the recording heads 29-1 and 29-2, respectively, are disposed at positions apart from each other by 180 degrees. However, in the cases of both systems for performing switching between reproduction channels 15-1 and 15-2 and for performing switching between recording channels 14-1 and 14-2, which will be described below, since recording channels and reproduction channels are independently disposed in the rotary transformer 11, the recording heads and the MR reproducing heads, respectively, are not necessarily required to be disposed at positions apart from each other by 180 degrees. Nevertheless, as will also be shown below, in the case of a system for performing both switching between the reproduction channels 15-1 and 15-2 and switching between the recording channels 14-1 and 14-2, since a channel 14 is used for recording signals and a channel 15 is used for reproducing signals, both the MR reproducing heads and the recording heads, respectively, must be disposed at positions apart from each other by 180 degrees.

Figure 6:
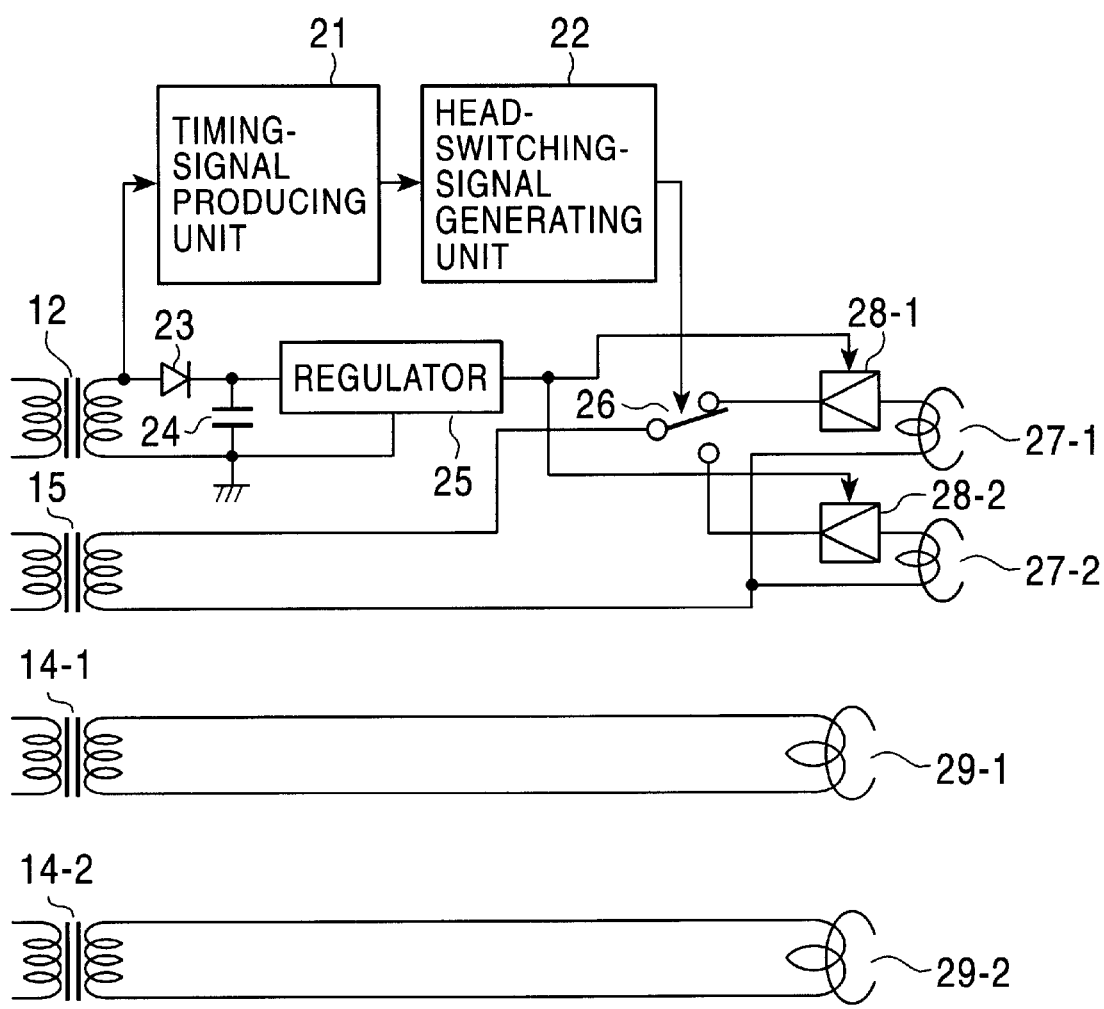
FIG. 6 is a circuit diagram showing the structure of the inside of a rotary drum corresponding to the rotary transformer shown in FIG. 5.

FIG. 6 shows a circuit diagram of the rotary unit as the rotary drum of the rotary transformer 11 shown in FIG. 5. An electric power signal, which is output from a power transmission channel 12 of the rotary transformer 11, is supplied to a timing-signal producing unit 21.

The timing-signal producing unit 21 detects a control signal superimposed on the inputted electric power signal, and uses the detected control signal to produce a timing signal required to generate a head switching signal, which is supplied to a head-switching-signal generating unit 22.

Based on the timing signal from the timing-signal producing unit 21, the head-switching-signal generating unit 22 generates a switching signal for performing switching between MR reproducing heads 27-1 and 27-2 so that one of the heads is selected by a switch 26. Amplifiers 28-1 and 28-2, respectively, amplify reproducing signals input from the corresponding reproducing heads 27-1 and 27-2 to output the amplified signals to a reproduction channel 15 of the rotary transformer 11 via the switch 26.

The electric power signal output from the power transmission channel 12 of the rotary transformer 11 is rectified/smoothed by a diode 23 and a capacitor 24 to be input to a regulator 25. The regulator 25 stabilizes the inputted signal voltage and supplies a DC voltage at a specified level to the amplifiers 28-1 and 28-2.

A record signal output from a recording channel 14-1 of the rotary transformer 11 is supplied to a recording head 29-1 of a first channel, and a record signal output from a recording channel 14-2 thereof is supplied to. a recording head 29-2 of a second channel.

Figure 8:
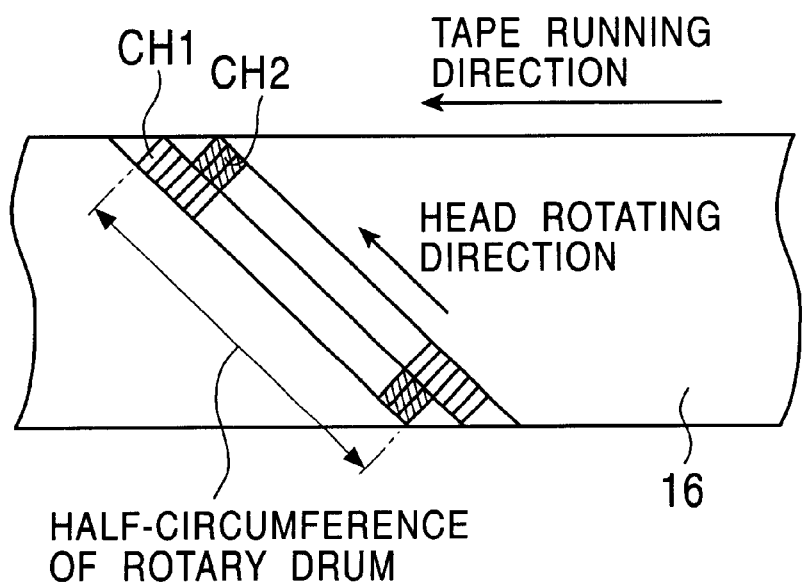
FIG. 8 is a view illustrating a track of the magnetic tape shown in FIG. 7.

As shown in FIG. 8, during a half rotation of the rotary drum 2, the reproducing head 27-1 as a first channel follows a track on a magnetic tape 16 to perform reproduction of a signal recorded on the magnetic tape 16. Then, after the half-rotation of the rotary drum 2, the reproducing head 27-1 comes apart from the magnetic tape 16, and, alternately, the reproducing head 27-2 as a second channel fits flush against the magnetic tape 16. During the rest half-rotation of the rotary drum 2, the reproducing head 27-2 performs reproduction of a signal recorded on the next track of the magnetic tape 16. In other words, the reproducing heads 27-1 and 27-2 run by alternately tracing the magnetic tape 16 during each half-rotation of the rotary drum 2 to reproduce the signals recorded on the magnetic tape 16.

Similar to the case of the above-described reproducing heads 27-1 and 27-2, the recording heads 29-1 and 29-2 also run by alternately tracing tracks of the magnetic tape 16 during each half-rotation of the rotary drum 2 to record signals on the magnetic tape 16.

As a result, at every half-rotation of the rotary drum 2, when the recorded signals are reproduced, switching between the reproducing heads 27-1 and 27-2 are performed, and when signals are recorded, switching between the recording heads 29-1 and 29-2 are performed.

Figure 9:
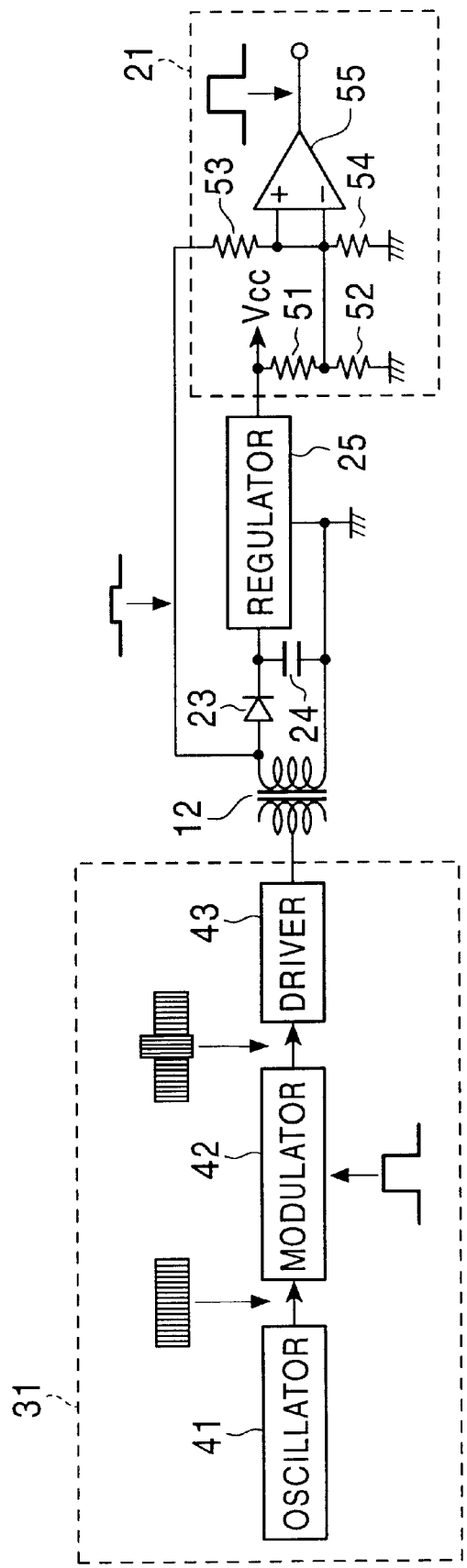
FIG. 9 is a circuit diagram showing a structural example of a timing-signal producing unit 21 shown in FIG. 6.

Next, a description will be given of the structure of the timing-signal producing unit 21 with reference to FIG. 9. In FIG. 9, a static unit 31 is comprised of an oscillator 41, a modulator 42, and a driver 43. The oscillator 41 oscillates an electric power signal of specified amplitude and a specified frequency to output the signal to a modulator 42. The modulator 42 modulates the amplitude of the input electric power signal, that is, performs AM modulation of the input electric power signal, so as to achieve in an increase in the amplitude of the electric power signal with a timing of switching between the heads, and then outputs the modulated signal to the driver 43. The driver 43 amplifies the electric power signal with the modulated amplitude to supply the signal to a power transmission channel 12 of a rotary transformer 11.

The voltage of the electric power signal, which is output from the power transmission channel 12 of a rotary transformer 11, is divided by resistors 53 and 54 in a timing-signal producing 21 to be input to the positive terminal of a comparator 55. A fixed voltage Vcc output from a regulator 25 is divided by resistors 51 and 52, and is supplied to a negative terminal of the comparator 55.

The comparator 55 compares the voltage level of the electric power signal having modulated amplitude with the reference-level voltage output from the regulator 25, and when the voltage level of the electric power signal exceeds the reference-level voltage, the comparator 55 detects the signal.

The detected signal is supplied as a timing signal to a head-switching-signal generating unit 22.

The timing-signal producing method performed by using the structure shown in FIG. 9 is suitable to a case in which no loss of an electric power signal is desired even when timing is provided to transmit a control signal.

Figure 10:
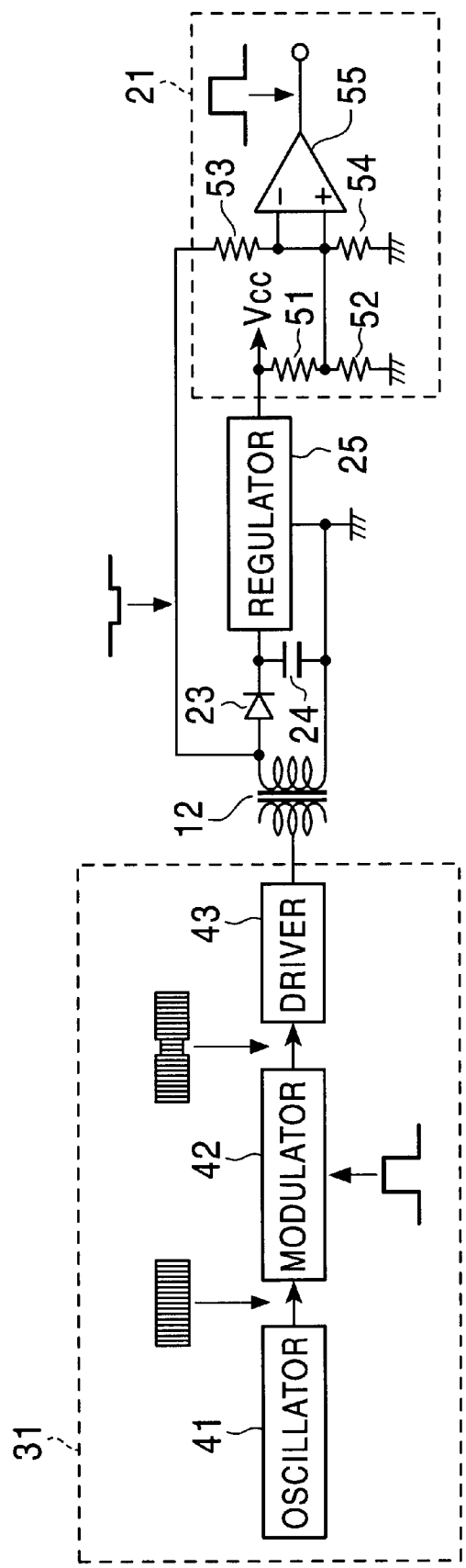
FIG. 10 is a circuit diagram showing another structural example of the timing-signal producing unit 21 shown in FIG. 6.

FIG. 10 shows a structural example in which a modulator 42 modulates the amplitude of an electric power signal in such a manner that the amplitude thereof is reduced based on a control signal. In this case, a comparator 55 is connected in such a manner that the input polarities of the comparator 55 are opposite to those in the case shown in FIG. 9. The other structural parts are the same as those shown in FIG. 9.

When the voltage level of an electric power signal falls below a reference voltage level, the comparator 55 detects the signal.

The timing-signal producing method performed by using the structure shown in FIG. 10 is suitable to a case in which reduction of consumption power is desired by decreasing as much as possible the power-supply voltage supplied to the power transmission channel 12 of the rotary transformer 11 from a driver 43.

Figure 11:
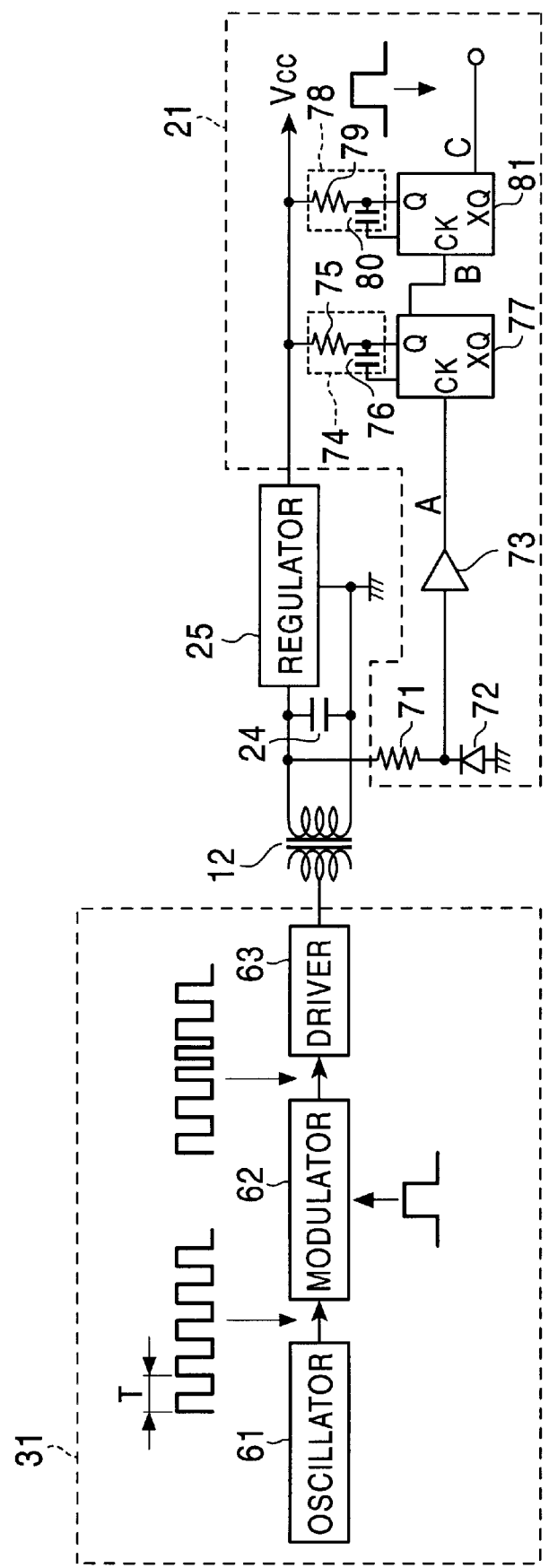
FIG. 11 is a circuit diagram showing another structural example of the timing-signal producing unit 21 shown in FIG. 6.

FIG. 11 shows a structure used when the frequency of an electric power signal is modulated.

In this figure, a static unit 31 is comprised of an oscillator 61, a modulator 62, and a driver 63. The oscillator 61 oscillates an electric power signal having a specified frequency whose periodicity is indicated by the symbol T to output to the modulator 62. The modulator 62 modulates the input electric power signal, that is, performs FM modulation of the electric power signal in such a manner that the frequency of the signal becomes higher, that is, the periodicity becomes smaller than T, according to a control signal, and then outputs the modulated signal to the driver 63. The driver 63 supplies the electric power signal after frequency modulation to a power transmission channel 12 of a rotary transformer 11.

The electric power signal output from the power transmission channel 12 of the rotary transformer 11 is smoothed by a capacitor 24, and then is supplied to a regulator 25. The regulator 25 stabilizes the supplied signal voltage to output as a specified-level DC voltage.

In the electric power signal output from the rotary transformer 11, a positive level signal is extracted by a series circuit comprised of a resistor 71 and a diode 72 and is applied to a clock terminal CK of a mono-multi vibrator 77 via an amplifier 73. An output of a non-inverting output terminal Q of the mono-multi vibrator 77 is applied to a clock terminal CK of a mono-multi vibrator 81. An output of an inverting output terminal XQ of the mono-multi vibrator 81 is output as a signal for detecting a control signal.

The detected signal is supplied, as a timing signal, to a head-switching-signal generating unit 22.

The mono-multi vibrators 77 and 81 are both retriggerable mono-multi vibrators. A time constant $t_{77}$ of the mono-multi vibrator 77 is set such that the value of $t_{77}$ is larger than that of 1/2T and smaller than that of T by a time constant circuit 74 comprised of a resistor 75 and a capacitor 76. Furthermore, A time constant $t_1$ of the mono-multi vibrator 81 is set in such a manner that the value of $t_{81}$ is larger than T and smaller than 2T by a time constant circuit 78 comprised of a resistor 79 and a capacitor 80.

Referring now to time charts shown in FIGS. 12A to 12D, a description will be given of the operation of the timing-signal producing unit 21 shown in FIG. 11. When the amplifier 73 generates a clock signal $PA_2$ shown in FIG. 12A, the mono-multi vibrator 77 is triggered at the rising edge, and the non-inverting output terminal Q of the mono-multi vibrator 77 outputs a high level signal $PB_1$ shown in FIG. 12B. Then, after the level of the signal $PB_1$ is maintained at a high level during the period of the time constant $t_{77}$, it drops to be lower.

In contrast, before the period of the time constant $t_{77}$ elapses, when the next clock signal from the amplifier 73 reaches the clock terminal CK of the mono-multi vibrator 77, furthermore, from the point in time, the high level output of the signal $PB_1$ is maintained during the period of the time constant $t_{77}$.

Figure 12A:
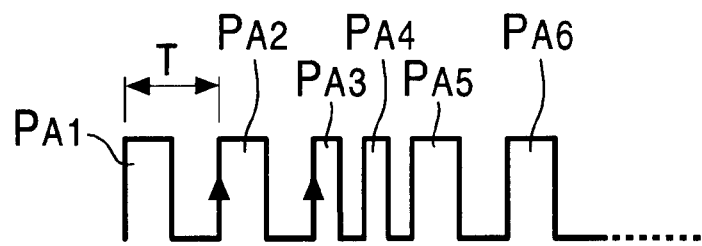
FIGS. 12A, 12B, 12C, and 12D show timing charts illustrating the operations of the timing-signal producing unit 21 shown in FIG. 11.
Figure 12B:
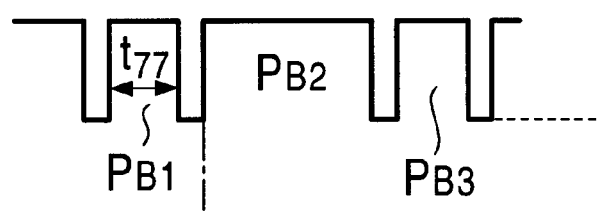

For example, in the time charts shown in FIG. 12, when a third clock signal $PA_3$ shown in FIG. 12A is applied to the clock terminal CK of the mono-multi vibrator 77 from the amplifier 73, the non-inverting output terminal Q of the mono-multi vibrator 77 outputs a high-level signal $PB_2$ shown in FIG. 12B. In addition, before the period of the time constant $t_{77}$ elapses, a fourth clock signal $PA_4$ from the amplifier 73 reaches the clock terminal CK of the mono-multivibrator 77. As a result, furthermore, from the point in time, the signal $PB_2$ is maintain as the high level output during the period of the time constant $t_{77}$. Similarly, before the period of the time constant $t_{77}$ elapses, furthermore, a fifth clock signal $PA_5$ generated from the amplifier 73 reaches the clock terminal CK of the mono-multi vibrator 77. As a result, from the point in time, the signal $PB_2$ is furthermore maintained as a high level output during the period of the time constant $t_{77}$. In addition, when the period of the time constant $t_{77}$ elapses before a sixth clock signal $PA_6$ generated from the amplifier 73 reaches the clock terminal CK of the mono-multi vibrator 77, the output of the signal $PB_2$ drops to a lower level as shown in FIG. 12B.

Figure 12C:
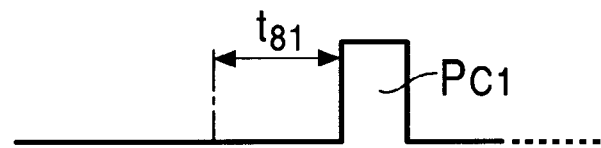
Figure 12D:
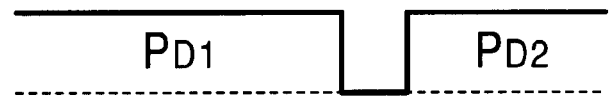

An output of the non-inverting output terminal Q of the mono-multi vibrator 77 is applied to the clock terminal CK of the mono-multi vibrator 81. When a first output signal $PB_1$ from the mono-multi vibrator 77 is applied to the clock terminal CK of the mono-multi vibrator 81, an output of the non-inverting output terminal Q of the mono-multi vibrator 81 increases at a high level as shown in FIG. 12D. After the high level output is maintained during the period of a time constant $t_{81}$, the output drops to a low level. In this situation, when a second output signal from the mono-multi vibrator 71 reaches the clock terminal CK of the mono-multi vibrator 81, furthermore, from the point in time, a high level output is maintained during the period of the time constant $t_{81}$. The output of the inverting output terminal XQ of the mono-multi vibrator 81 has a polarity opposite to that of the non-inverting output terminal Q, as shown in FIG. 12C. The output of the inverting output terminal XQ is output as a signal for detecting a control signal.

The detected signal is supplied as a timing signal to a head-switching-signal generating unit 22.

In the timing-signal producing method performed by the structure shown in FIG. 11, since a current flowing through the power transmission channel 12 is reduced by increasing the frequency of the timing signal, the method is suitable to a case in which much reduction of interference with a signal channel due to FM modulation is intended.

Figure 13:
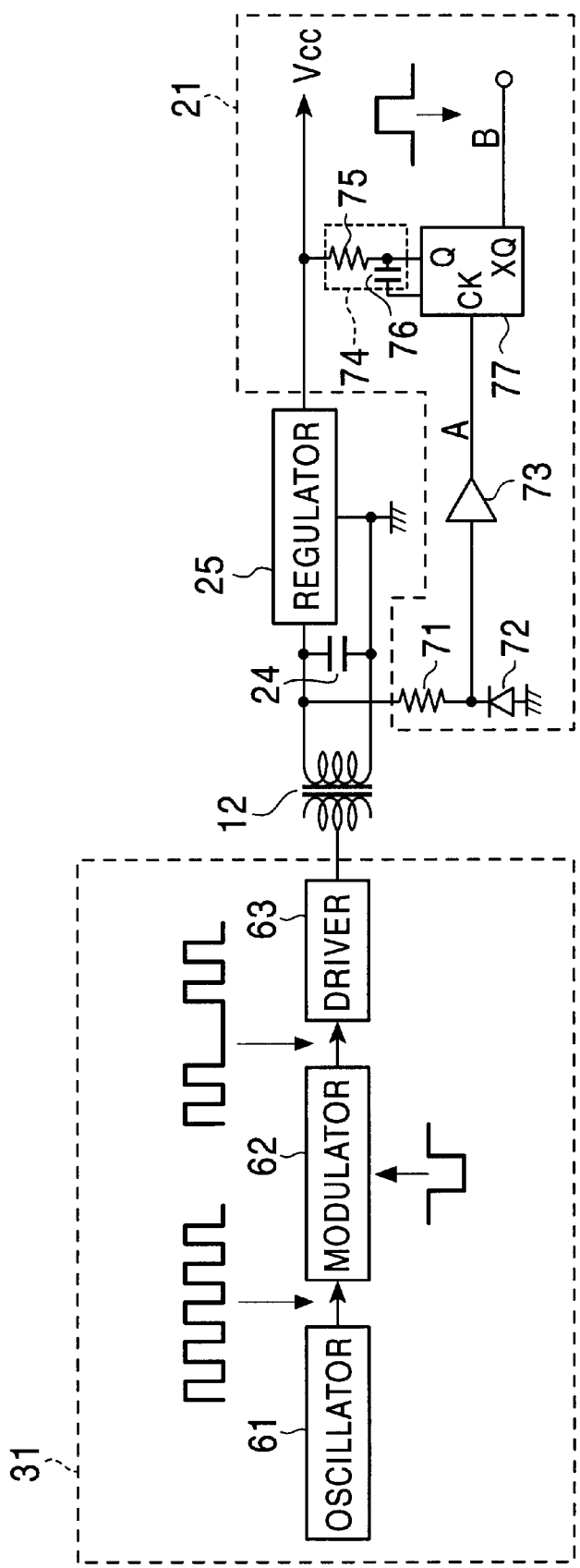
FIG. 13 is a circuit diagram showing another structural example of the timing-signal producing unit 21 shown in FIG. 6.

FIG. 13 shows a structural example used when FM modulation of an electric power signal is performed to reduce the frequency of the signal according to a control signal. In this case, an arrangement is set such that a mono-multi vibrator 81 is omitted, and only a mono-multi vibrator 77 is disposed. In addition, an output of an inverting-output terminal XQ is output as a signal detecting the control signal. The other structural parts are the same as those shown in FIG. 11. A time constant of the monomulti vibrator 77 is set such that the value of $t_{77}$ is larger than T and smaller than 2T.

Referring now to time charts shown in FIGS. 14A and 14B, the operation of the mono-multi vibrator 77 shown in FIG. 13 will be illustrated below.

Figure 14A:
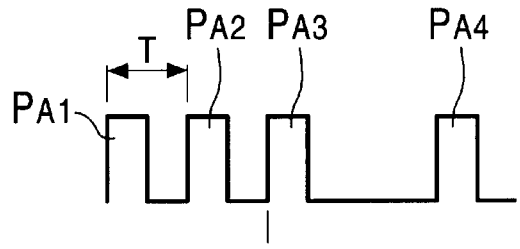
FIGS. 14A and 14B show timing charts illustrating the operations of the timing-signal producing unit 21 shown in FIG. 13.
Figure 14B:
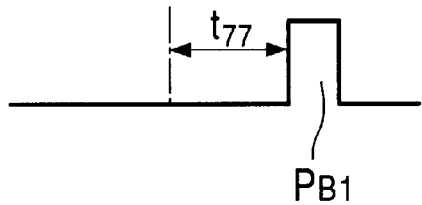

When a first clock signal $PA_1$ shown in FIG. 14A is applied from the amplifier 73 to the clock terminal CK of the mono-multi vibrator 77, the output of the non-inverting output terminal Q outputs a high-level signal. When the signal is not modulated by a control signal, before the period of the time constant $t_{77}$ elapses, a second clock signal $PA_2$ from the amplifier 73 reaches the clock terminal CK of the mono-multi vibrator 77. As a result, in this situation, the output of the inverting output terminal XQ remains at a low level as shown in FIG. 14B.

In contrast, when the signal is modulated by a control signal, during a time in which the period of the time constant $t_{77}$ elapses after a third clock signal $PA_3$ from the amplifier 73 is output, the next fourth clock signal $PA_4$ does not reach the clock terminal CK of the mono-multi vibrator 77. As a result, when the period of the time constant $t_{77}$ elapses, the output of the inverting output terminal XQ of the mono-multi vibrator 77, as shown in FIG. 14B, goes up to a high level, and the high-level output is output as a signal detecting the control signal.

The detected signal is supplied as a timing signal to a head-switching-signal generating unit 22.

The timing-signal producing method performed by the structure shown in FIG. 13 is suitable to a case in which a circuit for producing a timing signal needs to be simplified.

Figure 15:
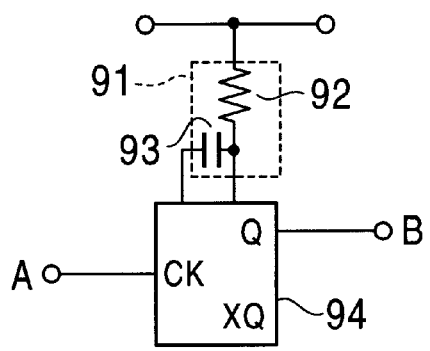
FIG. 15 is a circuit diagram showing a structural example of the head-switching-signal generating unit 22 shown in FIG. 6.

Next, the structure of the head-switching-signal generating unit 22 will be illustrated with reference to FIGS. 15 to 18. FIG. 15 shows a structural example of the head-switching-signal generating unit 22, in which signals for performing switching between reproducing heads 27-1 and 27-2 are generated based on the timing signal produced in the timing-signal producing unit 21.

The timing signal produced by the timing-signal producing unit 21 is applied to the clock terminal CK of a mono-multi vibrator 94. A time constant $t_{94}$ of a time-constant circuit 91 comprised of a resistor 92 and a capacitor 93 is set to be 1/2 of the rotation period $T_{drum}$ of a rotary drum 2.

When the output of a non-inverting output terminal Q of the mono-multi vibrator 94 is at a high level, the reproducing head 27-1 is selected by a switch 26, and when the output thereof is at a low level, the reproducing head 27-2 is selected by the switch 26.

Figure 16A:
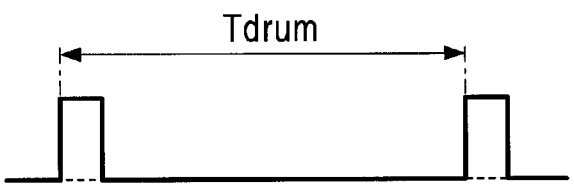
FIGS. 16A and 16B show timing charts illustrating the operations of the head-switching-signal generating unit 22 shown in FIG. 15.
Figure 16B:
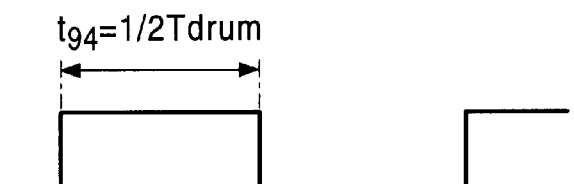

Referring to time charts shown in FIGS. 16A and 16B, the operation of the head-switching-signal generating unit 22 shown in FIG. 15 will be illustrate below. A timing signal, which is shown in FIG. 16A, produced by the timing-signal producing unit 21 is applied to the clock terminal CK of the mono-multi vibrator 94. The timing signal is generated at a rate of one time in $T_{drum}$ as the rotation period of a rotary drum 2. The output of the non-inverting output terminal Q of the mono-multi vibrator 94, which is shown in FIG. 16B, is at a high level only during the time of $T_{drum}/2$ after the timing signal is generated, and is at a low level during the remaining time of $T_{drum}/2$. When the output signal is at the high level, the reproducing head 27-1 is selected by the switch 26, and when the output signal is at the low level, the reproducing head 27-2 is selected by the switch 26.

Amplifiers 28-1 and 28-2 amplify reproducing signals input from the corresponding reproducing heads 27-1 and 27-2 to output to a reproduction channel 15 of the rotary transformer 11 via the switch 26 by the above switching signals.

Figure 17:
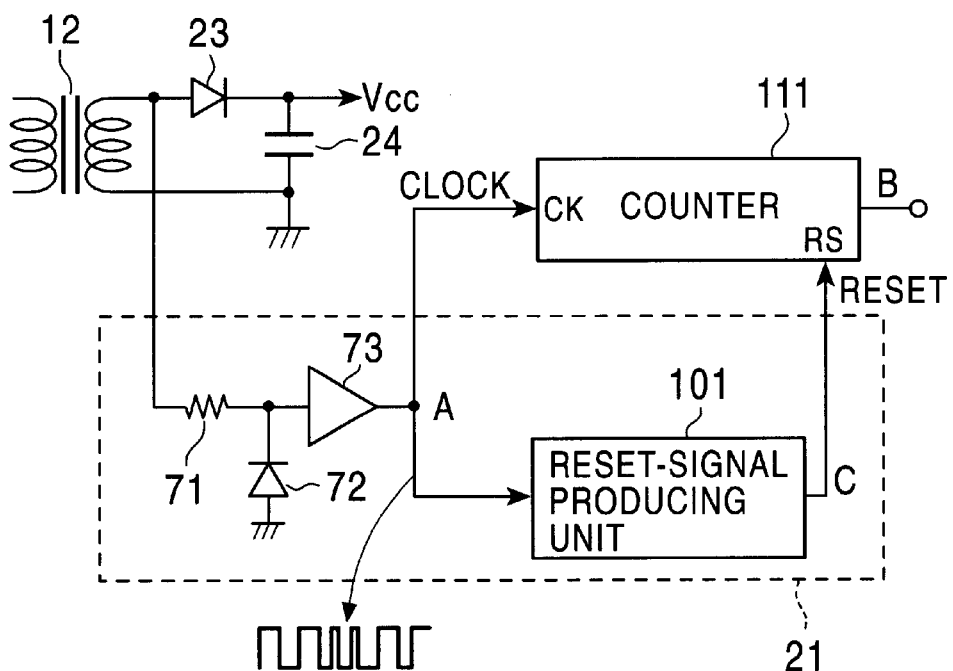
FIG. 17 is a circuit diagram showing another structural example of the head-switching-signal generating unit 22 shown in FIG. 8.

FIG. 17 shows a structural example in which a head-switching-signal generating unit 22 is formed by a counter 111 as a unit having an n-ary system counter. In this example, the output of the amplifier 73 shown in one of FIGS. 11 and 13 is supplied to the counter 111, and is also supplied to a reset-signal producing unit 101 comprised of either the mono-multi vibrators 77 and 81 shown in FIG. 11 or the mono-multi vibrator 77 shown in FIG. 13.

The reset-signal producing unit 101 produces the above timing signal to input to a reset terminal RS of the counter 111. The counter 111, for example, contains a phase locked loop (PLL) circuit to produce a clock in synch with a signal input to the clock terminal CK of the counter 111 and repeat a clock-counting operation every time the counter 111 is reset.

Figure 18A:
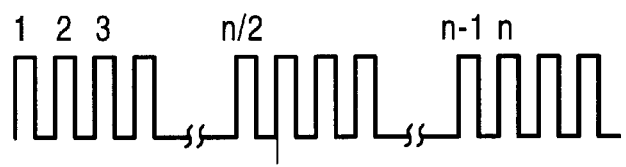
FIGS. 18A, 18B, and 18C show timing charts illustrating the operations of the head-switching-signal generating unit 22 shown in FIG. 17.
Figure 18B:
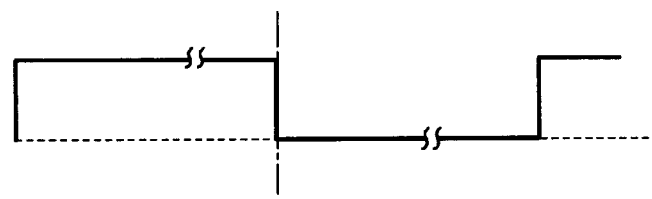

Referring now to time charts shown in FIGS. 18A to 18C, the operation of the example shown in FIG. 17 will be illustrated below. The amplifier 73 produces a fixed-level rectangular-waveform signal from a supplied electric power signal to input to the clock terminal CK of the counter 111 and the reset-signal producing unit 101. Inside the PLL circuit of the counter 111, a clock shown in FIG. 18A is generated from a clock signal synchronized with the signal input from the amplifier 73.

Figure 18C:
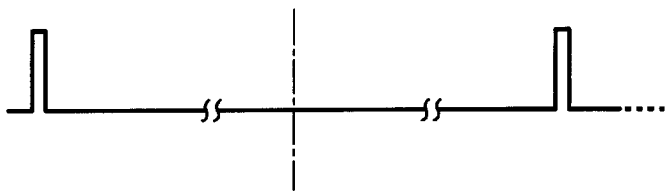

The reset-signal producing unit 101 produces the aforementioned timing signal, which is shown in FIG. 18C, and inputs as a reset signal to the reset terminal RS of the counter 111.

When the reset signal is input to the reset terminal RS of the counter 111, the n-ary system counter contained in the counter 111 resets figures counted by the time and counts clocks input after that time. Until the counted figure reaches n/2, the counter outputs high-level signals, whereas the instant moment when a {(n/2)+1}-th clock signal is generated, the counter allows the output of the signal to drop to be at a low level, as shown in FIG. 18B. After this, when another reset signal is input, the counter again resets the figures counted by the time to output a high-level signal, as shown in FIG. 18B.

In this case, when the rotation period of a rotary drum is represented by the symbol $T_{drum}$ and the frequency of an electric power signal is represented by the symbol f, the value of n is set such that n is equal to the value of $f \times T_{drum}$. As a result, the output of the counter changes into either a high-level output or a low-level output every half rotation of the rotary drum 2.

In the above embodiments, the methods of switching reproduction channels have been described. However, besides the above methods, the present invention can also be applied to a structure for switching recording channels, and a structure for switching both reproduction channels and recording channels.

Figure 19:
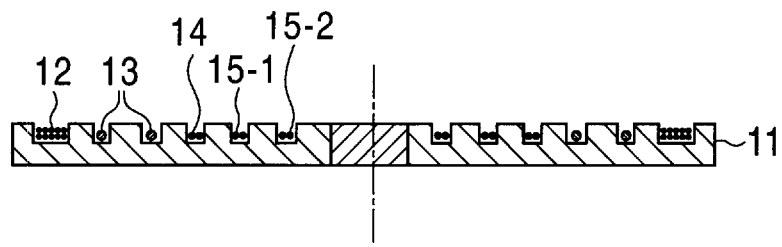
FIG. 19 is a sectional view showing another structural example of the rotary transformer applying the present invention.
Figure 20:
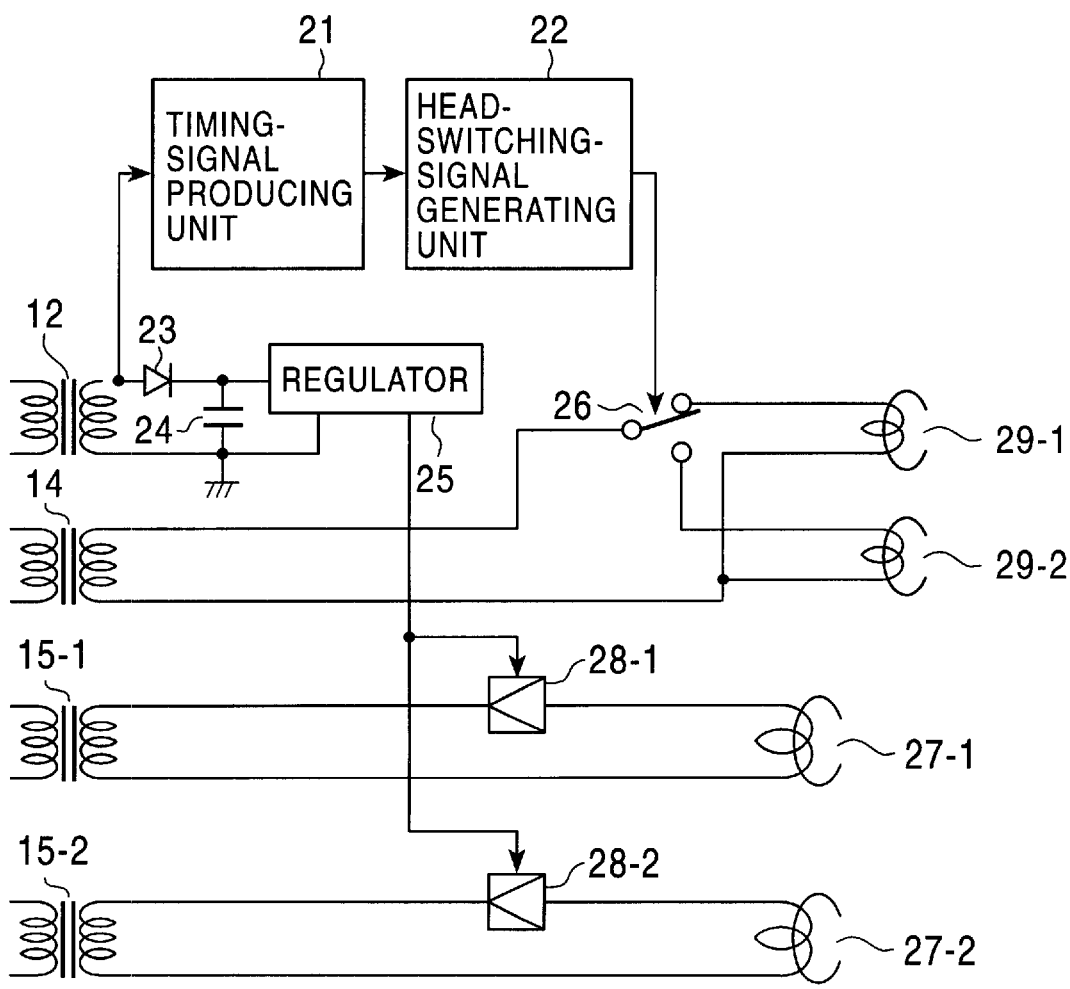
FIG. 20 is a circuit diagram showing the structural example of the inside of a rotary drum corresponding to the rotary transformer shown in FIG. 19.

For example, in a case of the structure for performing switching between recording channels, a rotary transformer is formed as shown in FIG. 19, and a circuit contained inside the rotary transformer is formed as shown in FIG. 20.

Figure 21:
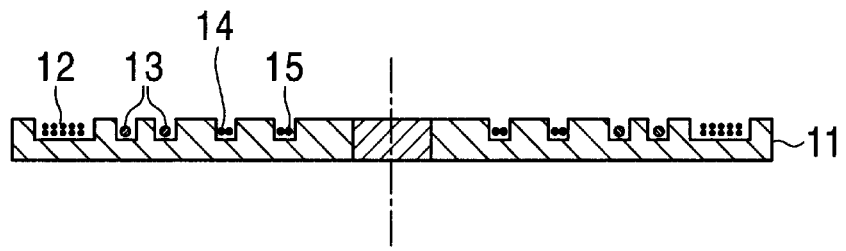
FIG. 21 is a sectional view showing another structural example of the rotary transformer applying the present invention.
Figure 22:
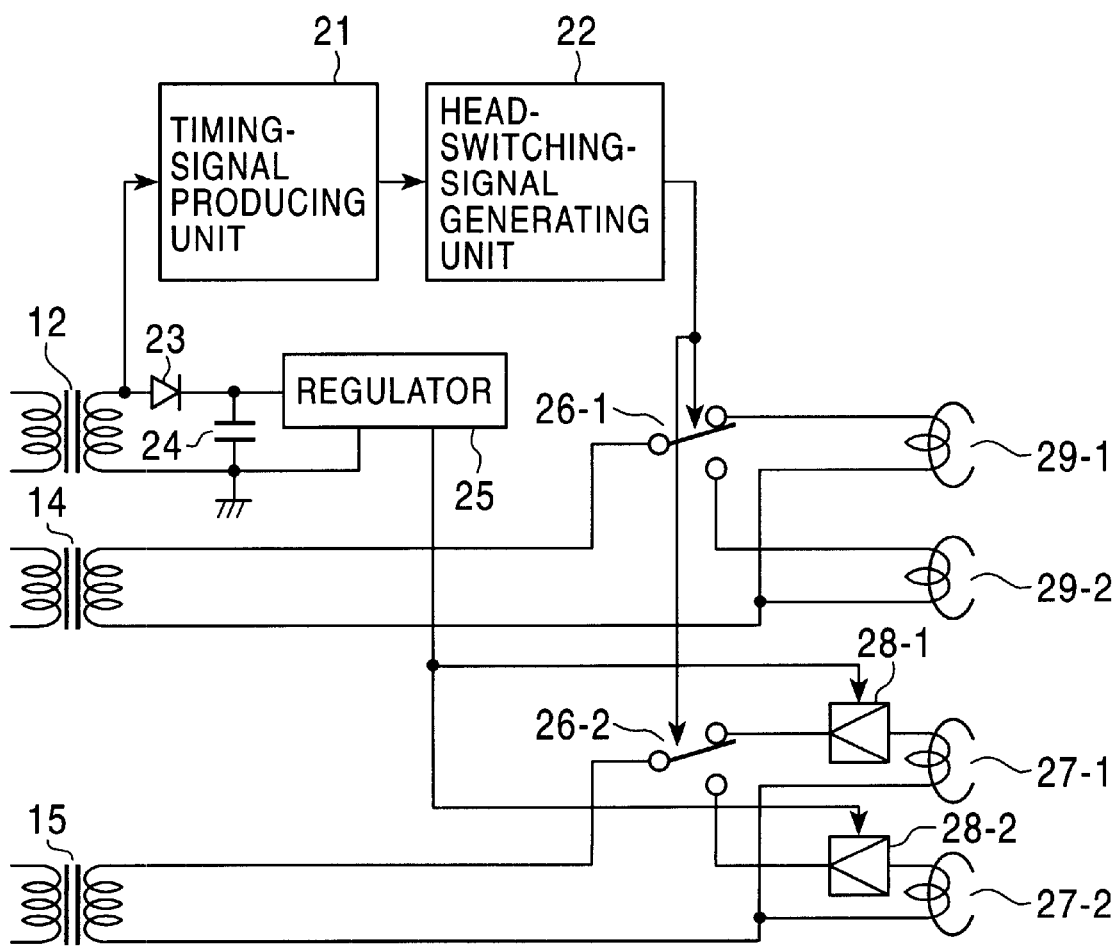
FIG. 22 is a circuit diagram showing the structural example of the inside of a rotary drum corresponding to the rotary transformer shown in FIG. 21.

In addition, in a case of the structure for performing both switching between reproduction channels and switching between recording channels, a rotary transformer may be formed as shown in FIG. 21, and a circuit contained inside the rotary transformer may be formed as shown in FIG. 22.

Since the structures and operations of these cases are the same as those shown in the above embodiments, the explanations thereof are omitted.

In the present invention, while the short-ring 13 for suppressing crosstalk remains as it is, at least one of the recording channel 14 and the reproduction channel 15 is switched. In this arrangement, with the use of the same number of grooves as that in the conventional art or the number of grooves less than that, the rotary transformer of the present invention can be formed. Accordingly, while crosstalk can be sufficiently suppressed, the size of the rotary transformer can be reduced.

As described above, in the signal processing apparatus and the signal processing method in accordance with the present invention, since the arrangement is made such that a control signal is superimposed on an electric power signal transmitted to the rotary transformer, the size reduction of the rotary transformer can be achieved while crosstalk can be sufficiently suppressed.

Additionally, while the invention has particularly shown and described with reference to the preferred embodiments thereof, it will be understood by those skilled in the art that the foregoing and other changes in form and details can be made therein, and it is intended to cover all such modifications as fall within the spirit and scope of the appended claims.

What is claimed is:

1. A signal processing apparatus comprising:
   a static unit;
   a rotary unit rotating in relation to the static unit;
   a plurality of recording/reproducing heads which are disposed on the rotary unit;
   a rotary transformer, via which signal reception/transmission is performed between the static unit and the rotary unit;
   means for generating an electric power signal supplied to a circuit inside the rotary unit from the static unit;
   means for superimposing a control signal on the electric power signal generated by the generating means;
   means for generating a reference-level voltage inside the rotary unit;
   means for comparing a voltage level of the superimposed electric power signal with the reference-level voltage so as to obtain a switching signal; and
   means for controlling the plurality of recording/reproducing heads inside the rotary unit by use of the switching signal.

2. A signal processing apparatus according to claim 1, wherein the rotary unit comprises two-channel heads used either for recording signals on a recording medium or for reproducing the signals recorded thereon; the rotary transformer comprises a transmission channel corresponding to the two-channel heads; and the controlling means performs switching between the two-channel heads according to the switching signal.

3. A signal processing apparatus according to claim 2, wherein the recording medium is a magnetic tape, and the two-channel heads are either recording heads for recording signals on the magnetic tape or reproducing heads for reproducing the signals recorded on the magnetic tape.

4. A signal processing apparatus according to claim 2 wherein at least said two-channel heads used for reproducing are magneto-resistive (MR) heads.

5. A signal processing apparatus according to claim 4 wherein said electric power supplied to the circuit inside the rotary unit is used to apply a bias signal to said MR heads.

6. A signal processing apparatus according to claim 2, wherein the rotary transformer comprises two shortrings disposed between a channel for transmitting the electric power and the recording and/or reproducing signal transmission channel.

7. A signal processing apparatus according to claim 1, wherein the rotary unit comprises first two-channel heads used for recording signals on a recording medium and second two-channel heads used for reproducing the signals recorded thereon; the rotary transformer comprises a transmission channel corresponding to each of the first and second two-channel heads; and the controlling means performs switching between the first two-channel heads and switching between the second two-channel heads, respectively, according to the switching signal.

8. A signal processing apparatus according to claim 7, wherein the recording medium is a magnetic tape, and the first and second two-channel heads are recording heads for recording signals on the magnetic tape and reproducing heads for reproducing the signals recorded on the magnetic tape.

9. A signal processing apparatus according to claim 7, wherein the rotary transformer comprises two shortrings disposed between a channel for transmitting the electric power and the recording and/or reproducing signal transmission channel.

10. A signal processing apparatus according to claim 7 wherein at least said two-channel heads used for reproducing are magneto-resistive (MR) heads.

11. A signal processing apparatus according to claim 10 wherein said electric power supplied to the circuit inside the rotary unit is used to apply a bias signal to said MR heads.

12. A signal processing method using a signal processing apparatus in which signal reception/transmission is performed between a static unit and a rotary unit rotating in relation to the static unit via a rotary transformer and in which a plurality of recording/reproducing heads are disposed on the rotary unit, the method comprising the steps of:

generating an electric power signal supplied to a circuit inside the rotary unit from the static unit;

superimposing a control signal on the electric power signal generated by the generating step;

generating a reference-level voltage inside the rotary unit;

comparing a voltage level of the superimposed electric power signal with the reference-level voltage so as to obtain a switching signal; and controlling the plurality of recording/reproducing heads inside the rotary unit by use of the switching signal.

13. A signal processing apparatus according to claim 7, wherein the rotary unit comprises two-channel heads used either for recording signals on a recording medium or for reproducing the signals recorded thereon; the rotary transformer comprises a transmission channel corresponding to the two-channel heads; and the controlling step comprises a step of performing switching between the two-channel heads according to the switching signal.

14. A signal processing method according to claim 13, wherein the recording medium is a magnetic tape, and the two-channel heads are either recording heads for recording signals on the magnetic tape or reproducing heads for reproducing the signals recorded on the magnetic tape.

15. A signal processing method according to claim 13, wherein at least said two-channel heads used for reproducing are magneto-resistive (MR) heads.

16. A signal processing method according to claim 15, wherein said electric power supplied to the circuit inside the rotary unit is used to apply a bias signal to said MR heads.

17. A signal processing apparatus according to claim 7, wherein the rotary unit comprises first two-channel heads used for recording signals on a recording medium and second two-channel heads used for reproducing the signals recorded thereon; the rotary transformer comprises a transmission channel corresponding to each of the first and second two-channel heads; and the controlling step comprises a step of performing switching between the first two-channel heads and switching between the second two-channel heads according to the switching signal.

18. A signal processing method according to claim 17, wherein the recording medium is a magnetic tape, and the first and second two-channel heads are recording heads for recording signals on the magnetic tape and reproducing heads for reproducing the signals recorded on the magnetic tape.

19. A signal processing method according to claim 17, wherein at least said two-channel heads used for reproducing are magneto-resistive (MR) heads.

20. A signal processing method according to claim 19, wherein, said electric power supplied to the circuit inside the rotary unit is used to apply a bias signal to said MR heads.

* * * * *